United States Patent
Hurwitz

(12) 
(10) Patent No.: US 10,882,578 B2
(45) Date of Patent: Jan. 5, 2021

(54) INCREASING THE INTERNAL PIVOT RADII FOR ANGLE-JOINED MOTORCYCLE HANDLE BARS

(71) Applicant: Magnum Shielding Corporation, Pittsford, NY (US)

(72) Inventor: Scott L. Hurwitz, Rochester, NY (US)

(73) Assignee: Magnum Shielding Corporation, Pittsford, NY (US)

( * ) Notice: Subject to any disclaimer, the term of this patent is extended or adjusted under 35 U.S.C. 154(b) by 0 days.

(21) Appl. No.: 16/007,595

(22) Filed: Jun. 13, 2018

(65) Prior Publication Data

US 2019/0382073 A1    Dec. 19, 2019

(51) Int. Cl.
| | |
|---|---|
| *B21D 41/02* | (2006.01) |
| *B62J 99/00* | (2020.01) |
| *B62K 21/12* | (2006.01) |
| *B62J 45/00* | (2020.01) |

(52) U.S. Cl.
CPC .............. *B62K 21/12* (2013.01); *B21D 41/02* (2013.01); *B62J 99/00* (2013.01); *B62J 45/00* (2020.02)

(58) Field of Classification Search
CPC ...... B62K 21/16; B62K 21/125; B62K 21/18; B62K 21/12; Y10T 74/20798; Y10T 403/32459; Y10T 403/604; B21D 41/02; B62J 11/19; B62J 99/00; B62J 45/00
See application file for complete search history.

(56) References Cited

U.S. PATENT DOCUMENTS

| | | | | |
|---|---|---|---|---|
| 597,801 | A | * | 1/1898 | Hall |
| 3,938,240 | A | * | 2/1976 | Holden ................. B21D 39/04 29/512 |
| 4,283,152 | A | * | 8/1981 | Smith ................... F16B 7/0486 403/3 |
| 5,144,859 | A | * | 9/1992 | Malone ................. B62K 21/16 403/108 |
| 6,561,931 | B1 | * | 5/2003 | Reeves ................ A63B 63/004 403/102 |
| 8,297,148 | B1 | * | 10/2012 | Ferguson ............. B62K 21/125 74/551.4 |
| 2005/0257640 | A1 | * | 11/2005 | Addink ................. B62K 19/16 74/551.1 |

(Continued)

FOREIGN PATENT DOCUMENTS

| | | | |
|---|---|---|---|
| GB | 9663 | * | 4/1911 |
| JP | 2001287683 A | * | 10/2001 |

OTHER PUBLICATIONS

Tube flaring—Google Search, Nov. 12, 2019 (Year: 2019).*

(Continued)

*Primary Examiner* — Vinh Luong
(74) *Attorney, Agent, or Firm* — Brian B. Shaw, Esq.; Harter Secrest & Emery LLP

(57) ABSTRACT

A motorcycle metal handle bar assembly for receiving a length of an internally routed wire harness assembly. The motorcycle metal handle bar assembly includes a first pipe having a first open end defined by a first angled cut, wherein the first open end defines a first periphery; a second pipe having a second open end defined by a second angled cut, wherein the second open end defines a second periphery; a joint at an interface of the first open end and the second open end, wherein at least one of the first open end and the second open end is flared.

13 Claims, 12 Drawing Sheets

(56) References Cited

U.S. PATENT DOCUMENTS

| | | | | |
|---|---|---|---|---|
| 2009/0000419 | A1* | 1/2009 | Wind | B62K 21/12 |
| | | | | 74/551.1 |
| 2009/0206307 | A1* | 8/2009 | Westberg | B60P 7/0853 |
| | | | | 254/243 |
| 2011/0272209 | A1* | 11/2011 | Tauschek | F01N 13/1844 |
| | | | | 181/228 |
| 2013/0074342 | A1* | 3/2013 | Hoffman | B21D 41/02 |
| | | | | 29/890.036 |
| 2013/0192411 | A1* | 8/2013 | Wong | B62K 21/12 |
| | | | | 74/551.9 |
| 2016/0176468 | A1* | 6/2016 | Poole | B62M 25/04 |
| | | | | 280/263 |
| 2016/0312677 | A1* | 10/2016 | Rusch | F01N 3/2066 |
| 2017/0035404 | A1* | 2/2017 | Foster | A61B 1/07 |
| 2017/0067582 | A1* | 3/2017 | Ollier | F16L 13/0209 |
| 2017/0135720 | A1* | 5/2017 | Oshida | A61M 5/343 |
| 2017/0191584 | A1* | 7/2017 | Burgess, Sr. | F16L 43/008 |
| 2018/0106557 | A1* | 4/2018 | Hong | C22C 38/04 |

OTHER PUBLICATIONS

Define arc—Google Search, Nov. 12, 2019 (Year: 2019).*
Flaring tubing in preparation for mounting lampshades, 2008 Ngineering, ngineering.com/tube_flaring.htm (Year: 2008).*
EPO machine translation of JP-2001287683 A, Inoue, Oct. 16, 2001. (Year: 2001).*

* cited by examiner

INCREASING THE INTERNAL PIVOT RADII FOR ANGLE-JOINED MOTORCYCLE HANDLE BARS

BACKGROUND OF THE INVENTION

Field of the Invention

The present invention relates generally to motorcycle handle bars, and more particularly to metal motorcycle handle bars for accumulating internal threading of a wire harness assembly.

Description of Related Art

Many motorcycle enthusiasts upgrade various components of their motorcycles. One such component is the motorcycle handle bars. The hand bar includes a grip area which is almost universally used for mounting controls including electrical switches for operating lights, horns, and directional signals. The manual operating controls such as throttles and brakes usually utilize external cables. However, the electrical switches, which are usually small-gauged fragile wires, often have their insulated wires positioned within the interior of the handle bar. Moreover, as the wires are fragile with rigid junctions, any sharp angles within the handle bar may cut into the wire's insulation or protective sheathing, and also inhibit installation of the wires. The wiring harness' rigid junction movement through the handlebar is often impeded at restricted passageways where critical pivoting radii is insufficient. Chaffing the wires is problematic due to the excessive force that may be required in order to pull the wires through the internal angled pathways.

The wire harness assemblies often include a coupling of segments of the individual wires or cables. The coupling is typically a rigid body that provides for the interconnection of the wire segments. In traditional handle bars, having the gently curved sections, passage of the coupling is not inhibited by the curved sections of the handle bar.

However, certain handle bars are at least partly defined by the joining of two intersecting pipes (or tubes). This intersection is often at 120 degrees or less, and in some designs 90 degrees or less and in further designs 60 degrees or less. These angled corners create an impediment to the passage of the wire harness coupling due to a lessened internal pivot radius, thereby requiring the disassembly of the assembly and the individual passing of each wire through the handle bar joint.

This disassembly and reassembly results in significant cost increase to the modification of the handle bars and also sometimes result in the chaffing or cutting into the protective insulation about the wires.

Thus, a need exists for motorcycle handle bars of the intersecting pipe design that can accommodate a wire harness assembly having a coupling without requiring excessive and damaging pulling force, disassembly, individual threading, and reassembly of the wire harness assembly.

BRIEF SUMMARY OF THE INVENTION

The present disclosure provides a motorcycle metal handle bar assembly for receiving a length of an internally routed wire harness assembly. The motorcycle metal handle bar assembly includes a first pipe having a first open end defined by a first angled cut, wherein the first open end defines a first periphery; a second pipe having a second open end defined by a second angled cut, wherein the second open end defines a second periphery; and a joint at an interface of the first open end and the second open end, wherein at least one of the first open end and the second open end is flared.

The first periphery may be elliptical. The second periphery may be elliptical. An internal pipe arc may be greater than if the at least one of the first open end and the second open end are free of being flared. Both the first open end and the second open end may be flared. The flared one of the first open end and the second open end may have a local thinning in a portion that is flared. The first periphery and the second periphery may be coplanar.

The present disclosure further provides a method of forming a portion of a metal handle bar assembly for a motorcycle. The method includes heating an angled end of a first pipe, the angled end defining a first open end of the first pipe, the first open end having a first periphery; flaring the first open end of the first pipe to define a flared first open end having a flared periphery, the flared periphery being larger than the first periphery; and joining the first pipe to a second pipe at an interface of the flared first open end and an angled end of the second pipe, wherein the angled end of the second pipe defines a second open end.

The method may further comprise flaring the second open end prior to joining the first pipe to the second pipe. Flaring the first open end may impart a local thinning of the first pipe to increase the periphery of the first open end to form a flared periphery. Flared periphery may increase a pivot radius of the joined first pipe and the second pipe as compared to a pivot radius if the first open end were not flared. The method may further include cutting the angled end of the first pipe to define the first open end of the first pipe. The method may further include cutting the angled end of the second pipe to define the second open end of the second pipe having the second periphery, the second periphery corresponding to the flared periphery.

The present disclosure also provides a motorcycle metal handle bar assembly for receiving a length of an internally routed wire harness assembly. The handle bar assembly includes a first pipe having a first open end defined by a first angled cut, wherein the first open end defines a first periphery; a second pipe having a second open end defined by a second angled cut, wherein the second open end defines a second periphery; a joint at an interface of the first open end and the second open end, wherein at least one of the first open end and the second open end includes a notch configured to form a gap between the first pipe and the second pipe; and an insert affixed to at least one of the first pipe and the second pipe, the insert at least partly occluding the gap.

The insert may be disposed within the first pipe and the second pipe. The insert may be affixed to an external surface of the at least one of the first pipe and the second pipe.

The present disclosure additionally provides a method of forming a portion of a metal handle bar assembly for a motorcycle. The method includes flaring a first open end of a first pipe to enlarge a periphery to define a flared first open end having a flared periphery; and joining the first pipe to a second pipe at an interface of the flared first open end and an angled end of the second pipe, wherein the angled end of the second pipe defines a second open end.

The method of forming the portion of the metal handle bar assembly for the motorcycle may further include passing a wiring harness through the joined first pipe and second pipe. The method of forming the portion of the metal handle bar assembly for the motorcycle may further include flaring the second open end of the second pipe prior to joining the first pipe to the second pipe. The flaring of the first open end of the first pipe and the second open end of the second pipe may be performed without heating the first open end of the first pipe and the second open end of the second pipe.

The present disclosure further provides a method of forming a portion of a metal handle bar assembly for a motorcycle. The method includes notching a first periphery of a first pipe having a first open end defined by a first angled cut, wherein the first open end defines the first periphery; joining the first pipe to a second pipe at an interface of the first periphery and an angled end of the second pipe, wherein the angled end of the second pipe defines a second open end and the notch forms a gap between the first open end and the second open end; and affixing an insert to at least one of the first pipe and the second pipe to at partly occlude the gap.

The present disclosure also provides a motorcycle metal handle bar assembly for receiving a length of an internally routed wire harness assembly. The motorcycle metal handle bar assembly includes a first pipe having a first open end defined by a first angled cut, wherein the first open end defines a first periphery; a second pipe having a second open end defined by a second angled cut, wherein the second open end defines a second periphery; and a joint at an interface of the first open end and the second open end, wherein at least one of the first periphery and the second periphery is an adjusted periphery, wherein the adjusted periphery exhibits a cross-sectional dimension that is greater than a cross-sectional dimension in an unadjusted portion of the at least one of the first periphery and the second periphery.

The first periphery may be elliptical. The second periphery may be elliptical. An internal pipe arc may be greater than if the at least one of the first periphery and the second periphery are free of being adjusted. Both the first periphery and the second periphery may be adjusted. The adjusted one of the first periphery and the second periphery may have a local thinning in a portion that is adjusted. The first periphery and the second periphery may be coplanar.

The present disclosure additionally provides a method of forming a portion of a metal handle bar assembly for a motorcycle. The method includes heating a first end of a first pipe, the first end defining a first open end of the first pipe, the first open end having an unadjusted first periphery; adjusting the first open end of the first pipe to define an adjusted first open end having an adjusted first periphery, a circumference of the adjusted first periphery being equal to a circumference of the unadjusted first periphery; cutting the first open end of the first pipe to define a first angled cut; and joining the first pipe to a second pipe at an interface of the adjusted first open end and a second end of the second pipe, wherein the second end of the second pipe defines a second open end.

The method of forming the portion of the metal handle bar assembly for the motorcycle may further include adjusting the second open end prior to joining the first pipe to the second pipe. The method of forming the portion of the metal handle bar assembly for the motorcycle may further include adjusting the second open end of the second pipe to define an adjusted second open end having an adjusted second periphery, a circumference of the adjusted second periphery being equal to a circumference of an unadjusted second periphery, the unadjusted second periphery corresponding to a periphery of the second open end of the second pipe prior to the adjusting of the second open end of the second pipe. The method of forming the portion of the metal handle bar assembly for the motorcycle may further include cutting the second end of the second pipe to define a second angled cut of the second pipe having the adjusted second periphery.

BRIEF DESCRIPTION OF THE SEVERAL VIEWS OF THE DRAWINGS

The accompanying drawings, which are included to provide further understanding of the present invention disclosed in the present disclosure and are incorporated in and constitute a part of this specification, illustrate aspects of the present invention and together with the description serve to explain the principles of the present invention. In the drawings.

DETAILED DESCRIPTION OF THE INVENTION

Figure 1:
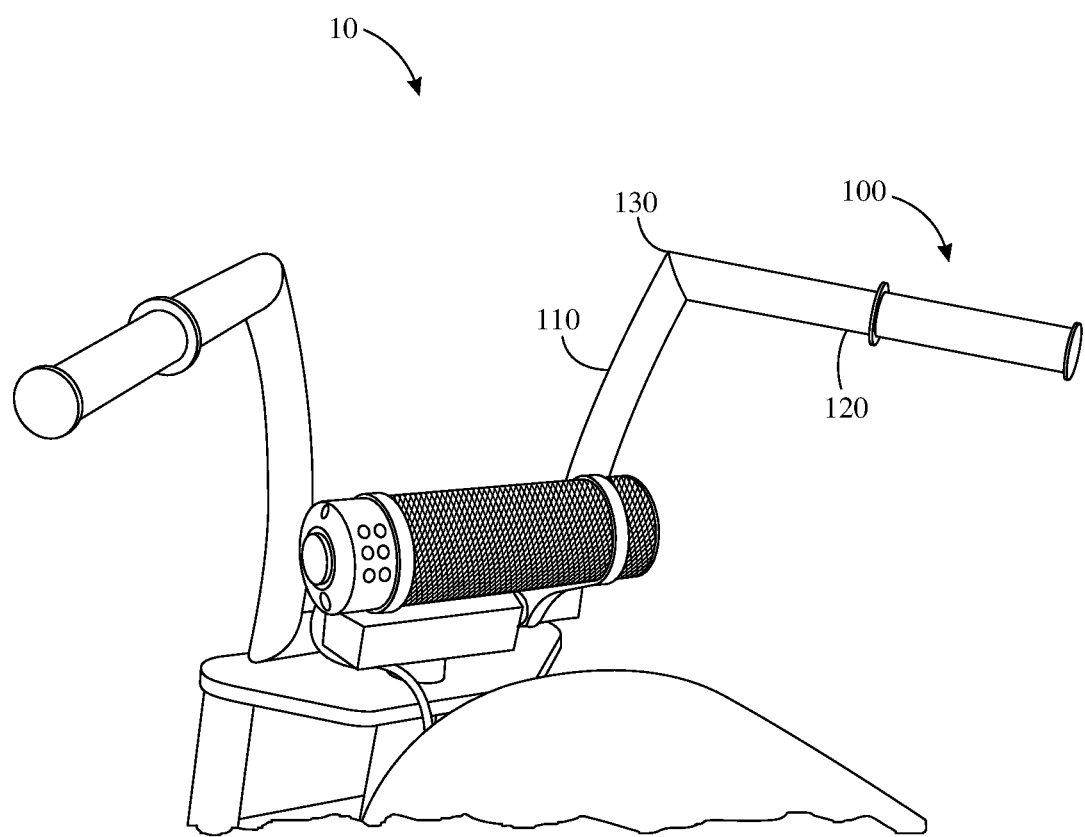
FIG. 1 is a perspective view of a motorcycle with a prior art handle bar assembly.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The detailed description set forth below is intended as a description of various configurations of the present disclosure and is not intended to represent the only configurations in which the present disclosure may be practiced. It will be apparent, however, to those of ordinary skill in the art that the present disclosure is not limited to the specific details set forth herein and may be practiced without these specific details.

Where they are used herein, the terms "first," "second," and so on, do not necessarily denote any ordinal, sequential, or priority relation, but are simply used to more clearly distinguish one element or set of elements from another, unless specified otherwise. By "exemplary" is meant to be "an example of," not intended to suggest any preferred or ideal embodiment.

The term "flared" means a periphery of an open end has been increased relative to its nominal or prior dimension. The term "adjusted periphery" is understood for example a circular cross-sectional pipe could be adjusted to an elliptical cross-section, wherein only the major dimension of the elliptical cross-section is greater than the dimension of the circular cross-section and thus the periphery is not increased.

Referring now to the drawings, and more particularly FIGS. 1-4 thereof, a prior art motorcycle handle bar assembly is provided, of which prior art is generally indicated at 100. Prior art handle bar assembly 100 is shown broadly including a first pipe 110, a second pipe 120, a joint 130, and a wire harness assembly 140.

Second pipe 120 includes a second open end 122, a second angled cut 124, and a second periphery 126.

Figure 2:
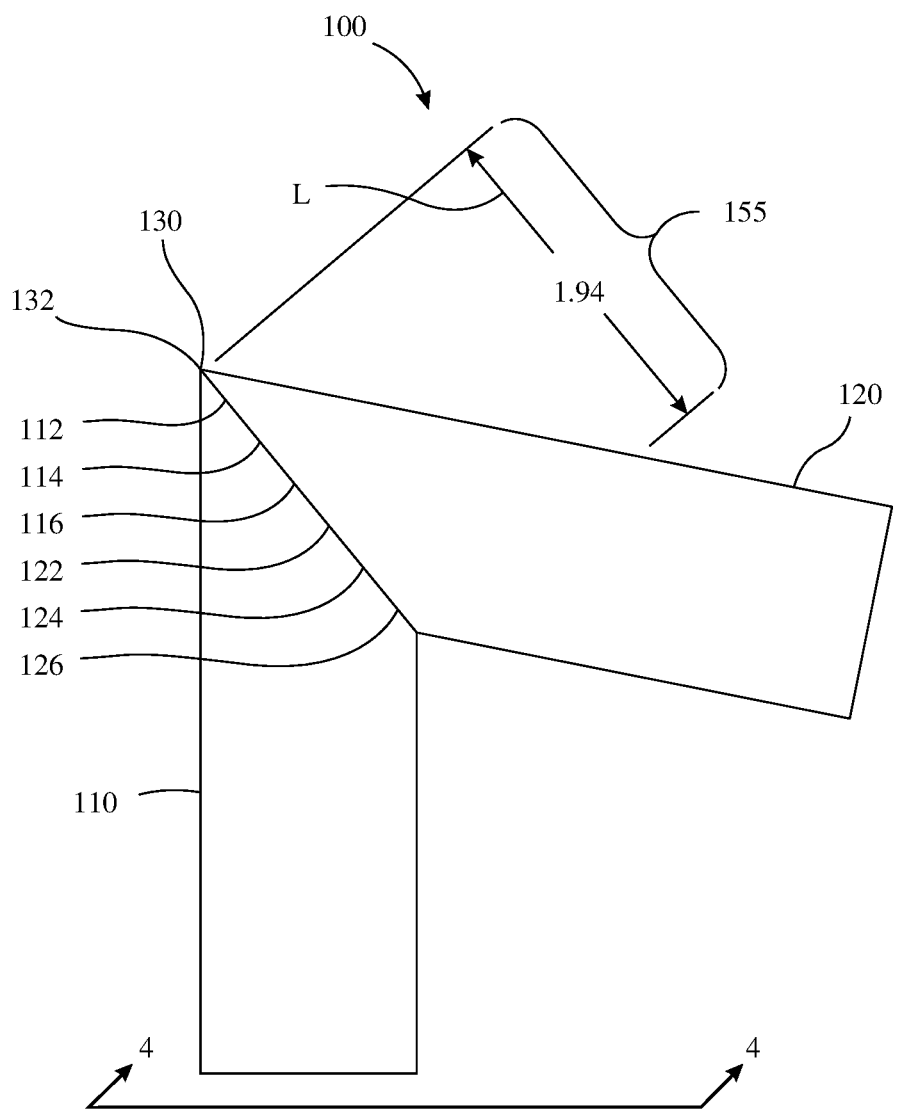
FIG. 2 is a top view of the prior art handle bar assembly of FIG. 1.
Figure 3:
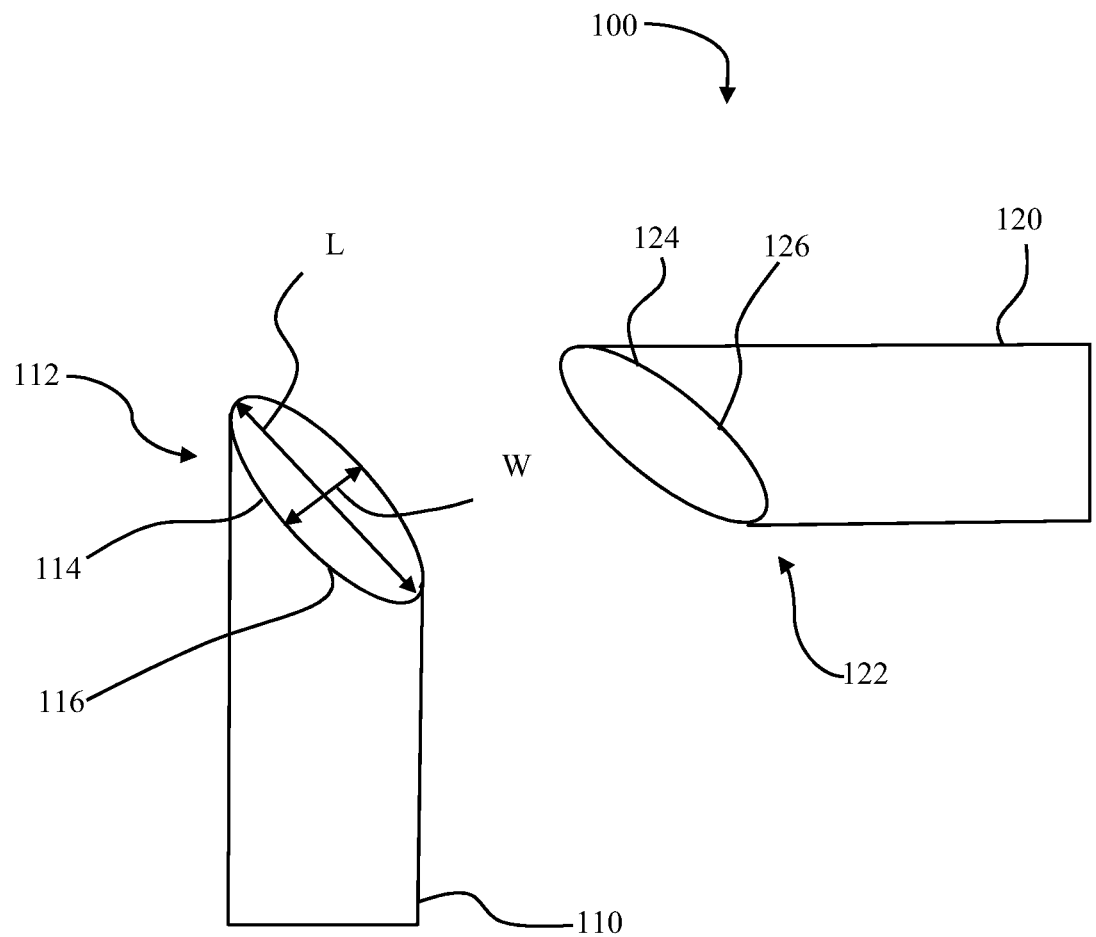
FIG. 3 is an exploded top, perspective view of a first pipe and a second pipe of the prior art handle bar assembly of FIG. 1.
Figure 4:
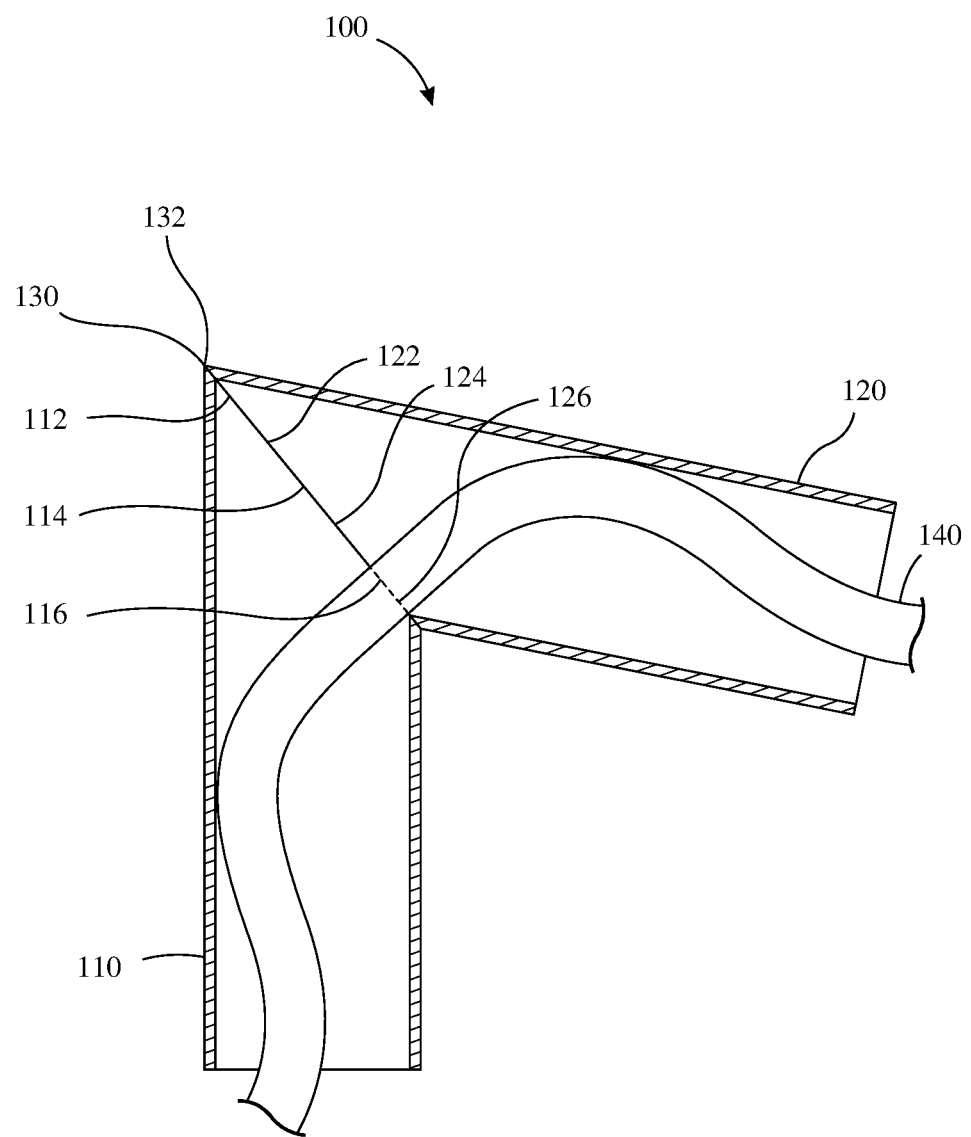
FIG. 4 is a top cross-sectional view of the prior art handle bar assembly of FIG. 2 taken along lines 4-4 of FIG. 2 with a wire harness assembly added to the prior art handle bar assembly of FIG. 2.

Prior art joint 130 may be formed at an interface 132. A cross-section of joint 130 includes a length L and width W. Length L of the cross-section of joint 130 may be approximately 1.94 inches as shown in FIG. 3. An internal pipe arc 155 is shown in FIG. 2, which arc can pivot about an exterior corner of the joint 130.

Wire harness assembly 140 is positioned within an interior region of handle bar assembly 100. As seen in prior art FIG. 4, the coupling is unable to pass through the corner between second pipe 120 and first pipe 110. That is, the coupling cannot pivot about the interior corner of the joined first and second pipe 110, 120.

Figure 5:
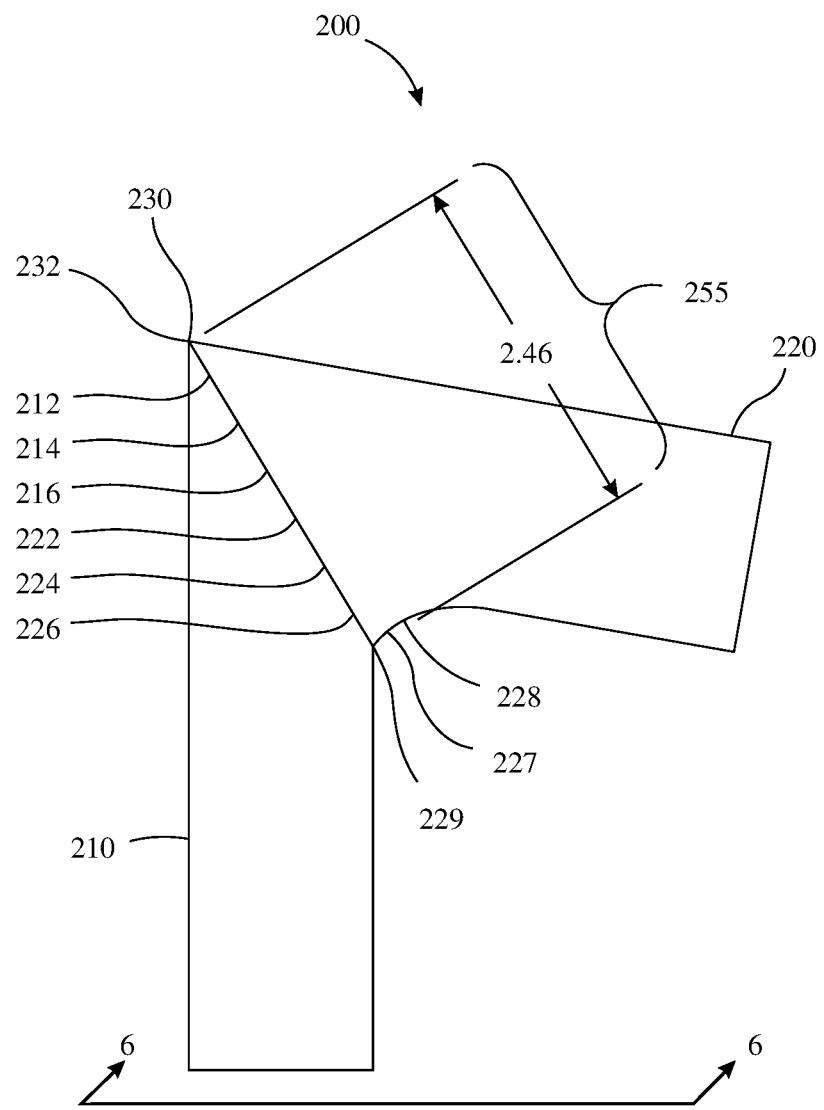
FIG. 5 is a top schematic view of a first embodiment of a handle bar assembly.
Figure 6:
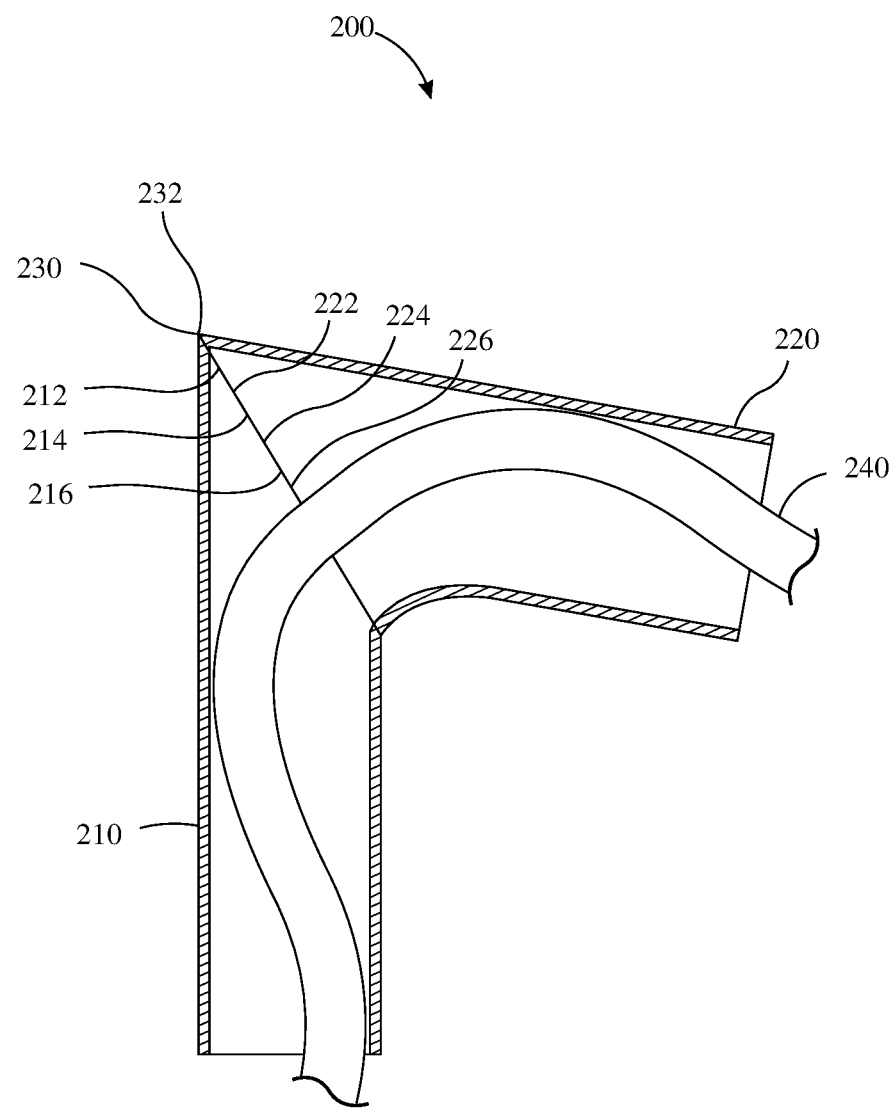
FIG. 6 is a top cross-sectional view of the handle bar assembly of FIG. 5 taken along lines 6-6 of FIG. 5 with a wire harness assembly added to the handle bar assembly of FIG. 5.

Referring to FIGS. 5 and 6, a handle bar assembly of the present system such as a motorcycle handle bar assembly is provided, of which is generally indicated at 200, wherein one of the pipes has a flared open end at a junction. Handle bar assembly 200 is shown broadly including a first pipe 210, a second pipe 220, a joint 230, and a wire harness assembly 240. First pipe 210 includes a first open end 212, a first angled cut 214, and a first periphery 216. First periphery 216 may be circular, elliptical, polygonal, or any other shape suitable for the intended purpose and understood by one of ordinary skill in the art. First angled cut 214 may be formed to define first open end 212 of first pipe 210 by cutting, turning, milling, drilling, grinding, sawing, and burning by laser, oxy-fuel burning, and plasma.

Second pipe 220 includes a second open end 222, a second angled cut 224, and a second periphery 226. Second periphery 226 may be circular, elliptical, polygonal, or any other shape suitable for the intended purpose and understood by one of ordinary skill in the art. First periphery 216 and second periphery 226 may be coplanar. Alternatively, the peripheries may only partly occupy a common plane. Second angled cut 224 may be formed to define second open end 222 of second pipe 220 by cutting, turning, milling, drilling, grinding, sawing, and burning by laser, oxy-fuel burning, and plasma.

Joint 230 may be formed at an interface 232. A cross-section of joint 230 includes a length and width. The length of the cross-section of joint 230 may be approximately 2.46 inches as shown in FIG. 5. In a preferred configuration, the cross-section dimension L is greater than if each of the first periphery and the second periphery are free of a flared or cut out end, as seen in FIG. 3.

Second open end 222 may be flared 227 such as by a local thinning in a portion that is flared 227. Second open end 222 may be flared 227 prior to joining first pipe 210 to second pipe 220. The local thinning in the portion that is flared 227 increases the periphery of second open end 222 to form a flared periphery. First pipe 210 may be joined to second pipe 220 by welding, soldering, riveting, adhesive bonding, or any other method of joining and assembling suitable for the intended purpose and understood by one of ordinary skill in the art.

The flared periphery also increases a pivot radius 228 of the joined first pipe 210 and second pipe 220 as compared to a pivot radius if second open end 222 were not flared. The flared periphery may also lie in a plane. Alternatively, the flared periphery may not be planar.

An interior portion of interface 232 defines a pivot surface 229, such that pivot surface 229 is spaced from an exterior portion of interface 232 by a greater distance than if first open end 212 and second open end 222 are free of being flared. For example, the distance between pivot surface 229 and the exterior portion of interface 232 is 2.46 inches as shown in FIG. 5 (similar to the length of the cross-section of joint 230), while the distance between pivot surface 229 and the exterior portion of interface 232 without any flare is 1.94 inches as shown in FIG. 2, thus providing an internal pipe arc 255 which can pivot about an exterior corner of the exterior portion of the interface 232 in FIG. 5 and which is greater than internal pipe arc 155 of FIG. 2. Thus, handle bar assembly 200 wherein at least one of the pipes 210, 220 has a flared end at the junction, can accommodate (or pass) a coupling of wire harness assembly 240, thereby allowing threading of wire harness assembly 240 without requiring disassembling the coupling.

Wire harness assembly 240 is positioned within an interior region of handle bar assembly 200 wherein the coupling is able to pass about the corner between first pipe 210 and second pipe 220.

Figure 7A:
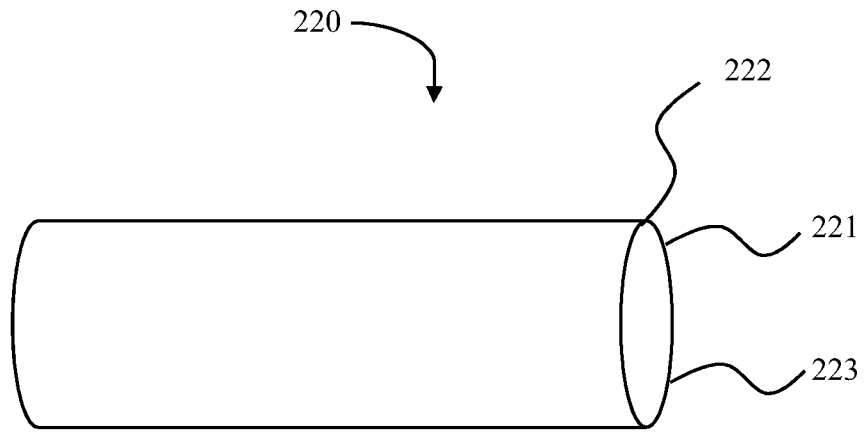
FIGS. 7A-7C are side perspective views an unadjusted, adjusted, and adjusted/cut second open end of the handle bar assembly of FIG. 5.
Figure 7B:
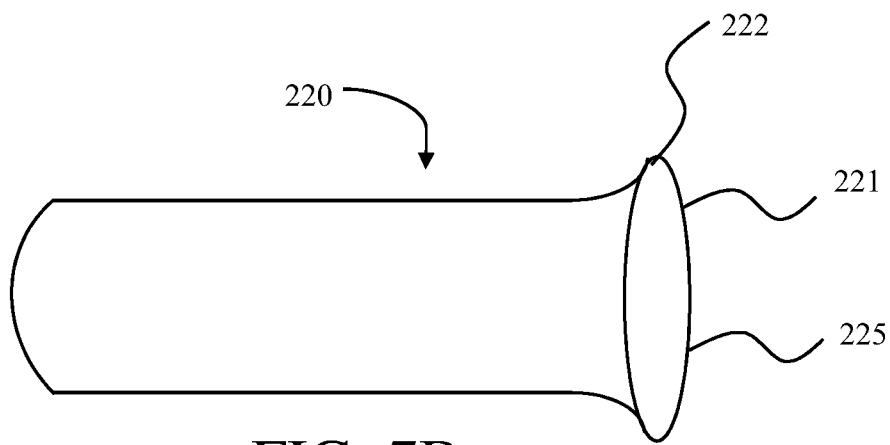
Figure 7C:
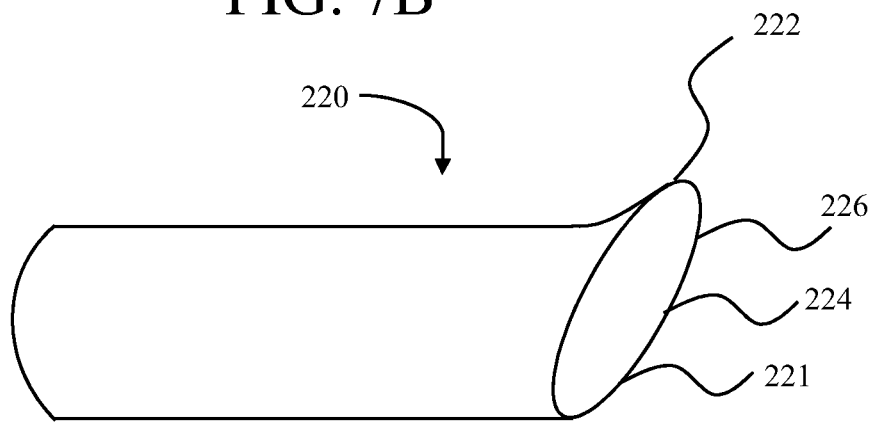

Alternatively, as shown in FIGS. 7A-7C, at least one of first periphery 216 and second periphery 226 may be a periphery that has been adjusted and cut (e.g., FIG. 7C), wherein the adjusted, cut periphery exhibits a cross-sectional dimension that is greater than a cross-sectional dimension in an unadjusted periphery 223 of the at least one of first periphery 216 and second periphery 226. For example, FIG. 7A illustrates second pipe 220 having unadjusted second periphery 223 prior to adjustment of second open end 222 of second pipe 220. FIG. 7B illustrates second open end 222 being "compressed" and defining an adjusted second periphery 225. Adjusted second periphery 225 includes a circumference that is the same as a circumference of unadjusted second periphery 223. However, adjusted second periphery 225 exhibits a cross-sectional dimension that is greater than a cross-sectional dimension in unadjusted second periphery 223. FIG. 7C illustrates second open end 222 of second pipe 210 after being adjusted and cut, which defines second periphery 226.

The present disclosure also provides a method of forming a portion of handle bar assembly 200. The method includes heating a second end 221 of second pipe 220, second end 221 defining second open end 222 of second pipe 220;

adjusting second open end 222 of second pipe 220 to define adjusted second open end 222 having adjusted second periphery 225; cutting second open end 222 of second pipe 220 to define second angled cut 224; and joining second pipe 220 to first pipe 210 at interface 232 of the adjusted second open end 222 and a first end of first pipe 210, the first end of first pipe 210 defining first open end 212.

The method of forming the portion of handle bar assembly 200 may further include adjusting first open end 212 prior to joining second pipe 210 to first pipe 210. The method of forming the portion of handle bar assembly 200 may further include adjusting first open end 212 of first pipe 210 to define an adjusted first open end 212 having an adjusted first periphery, a circumference of the adjusted first periphery being equal to a circumference of an unadjusted first periphery, the unadjusted first periphery corresponding to a periphery of first open end 212 of first pipe 210 prior to the adjusting of first open end 212 of first pipe 210. The method of forming the portion of handle bar assembly 200 may further include cutting the first end of first pipe 220 to define first angled cut 214 of first pipe 210 having the adjusted first periphery.

Figure 8:
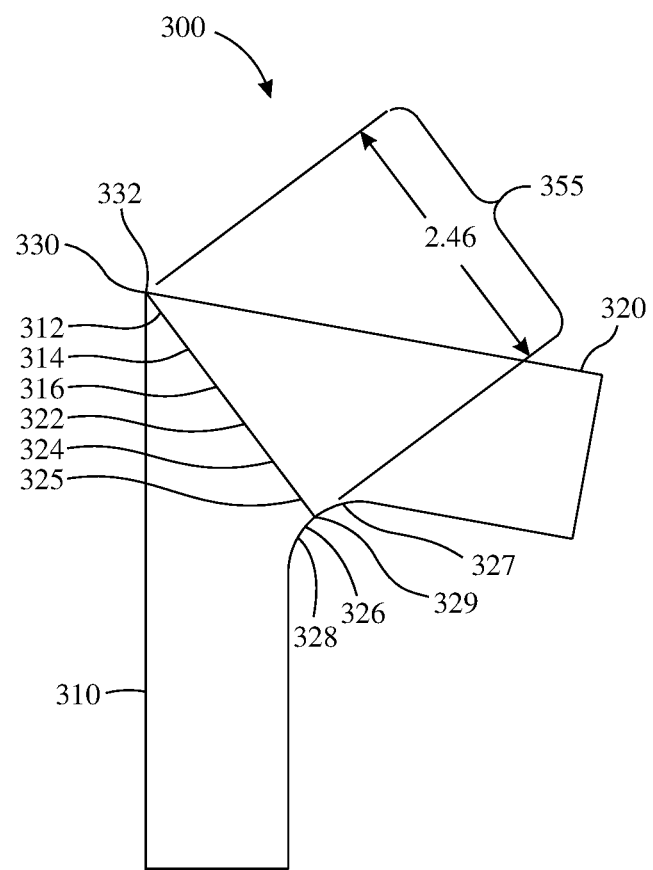
FIG. 8 is a top schematic view of a second embodiment of a handle bar assembly.
Figure 9:
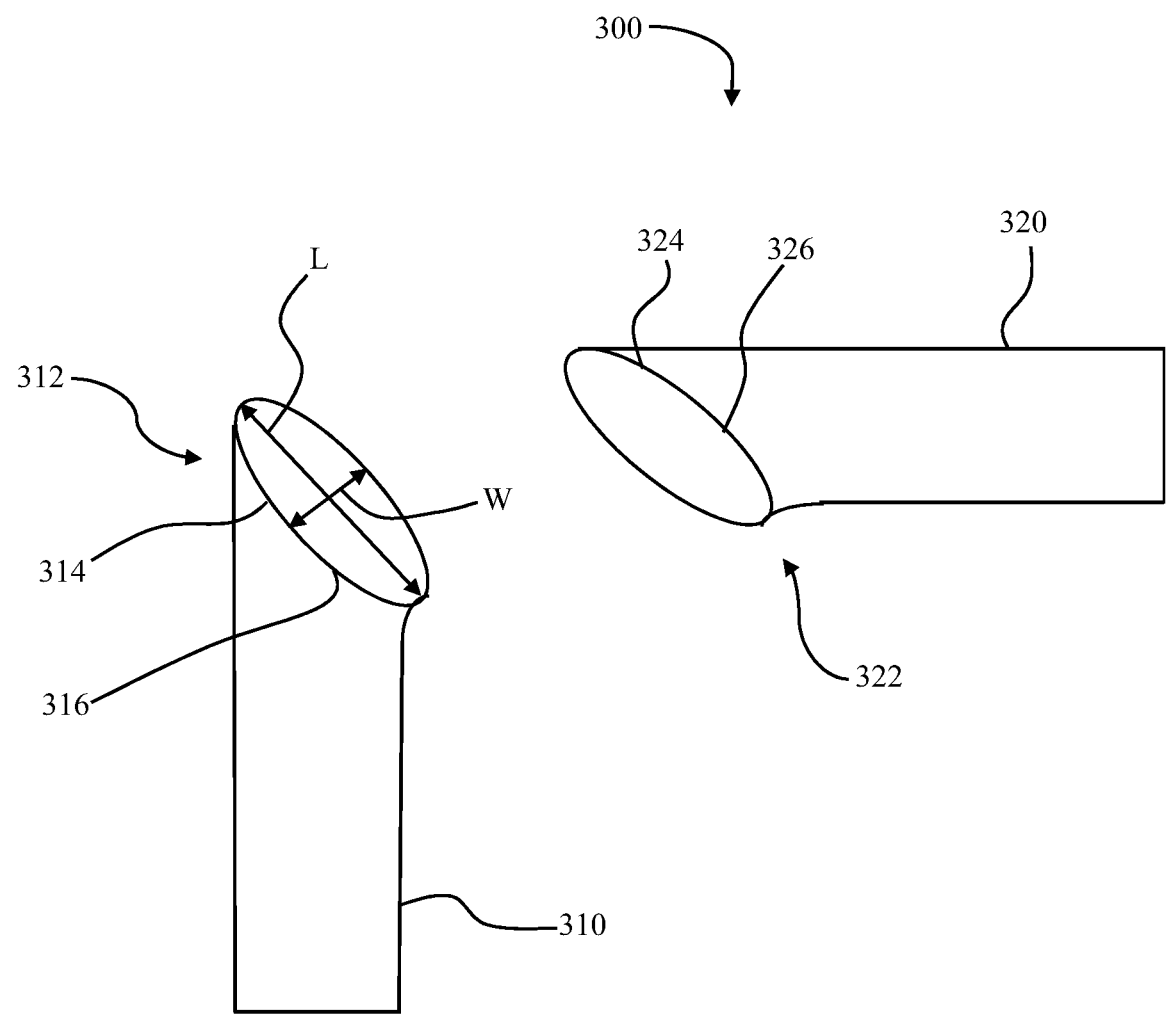
FIG. 9 is an exploded top, perspective view of a first pipe and a second pipe of the handle bar assembly of FIG. 8.

Referring to FIGS. 8 and 9, a handle bar assembly is provided, of which a second embodiment is generally indicated at 300, wherein both pipes have a flared end at the junction. Handle bar assembly 300 is shown broadly including a first pipe 310, a second pipe 320, and a joint 330. First pipe 310 includes a first open end 312, a first angled cut 314, and a first periphery 316. First periphery 316 may be circular, elliptical, polygonal, or any other shape suitable for the intended purpose and understood by one of ordinary skill in the art. First angled cut 314 may be formed to define first open end 312 of first pipe 310 by cutting, turning, milling, drilling, grinding, sawing, and burning by laser, oxy-fuel burning, and plasma.

Second pipe 320 includes a second open end 322, a second angled cut 324, and a second periphery 325. Second periphery 326 may be circular, elliptical, polygonal, or any other shape suitable for the intended purpose and understood by one of ordinary skill in the art. First periphery 316 and second periphery 326 may be coplanar. Alternatively, the first periphery and the second periphery may be only partly in a common plane. Second angled cut 324 may be formed to define second open end 322 of second pipe 320 by cutting, turning, milling, drilling, grinding, sawing, and burning by laser, oxy-fuel burning, and plasma.

Joint 330 may be formed at an interface 332. A cross-section of joint 330 includes a length L and width W. Length L of the cross-section of joint 330 may be approximately 2.46 inches as shown in FIG. 8.

Both first open end 312 and second open end 322 are flared 326, 327. First open end 312 is flared 326 and have a local thinning in a portion that is flared 326. First open end 312 may be flared 326 prior to joining first pipe 310 to second pipe 320. The local thinning in the portion that is flared 326, 327 increases the periphery of first open end 312 and second open end 322 to form a flared periphery. Second open end 322 may be flared 327 prior to joining first pipe 310 to second pipe 320. The flaring of both first open end 312 of first pipe 310 and second open end 322 of second pipe 320 may be formed without heating first open end 312 of first pipe 310 and second open end 322 of second pipe 320. If both first open end 312 of first pipe 310 and second open end 322 of second pipe 320 are flared, the amount of flare of each pipe 310, 320 may be less than if only one pipe is flared. As such, the reduced amount of flare may be formed by cold working rather than heat working/treatment. If only one pipe is flared, then heat working/treatment may be required over cold working because of the possibility of cracking the one pipe due to the amount of increased flare. First pipe 310 may be joined to second pipe 320 by welding, soldering, riveting, adhesive bonding, or any other method of joining and assembling.

The flared peripheries increase a pivot radius 328 of the joined first pipe 310 and second pipe 320 as compared to a pivot radius if first open end 312 and second open end 322 were not flared. The flared periphery may also lie in a plane. Thus, internal pipe arc 355 of FIG. 8 is greater than internal pipe arc 155 of FIG. 2.

An interior portion of interface 332 may define a pivot surface 329, such that pivot surface 329 is spaced from an exterior portion of interface 332 by a greater distance than if first open end 312 and second open end 322 are free of being flared. For example, the distance between pivot surface 329 and the exterior portion of interface 332 is 2.46 inches as shown in FIG. 8 (similar to length L of the cross-section of joint 330), while the distance between pivot surface 329 and the exterior portion of interface 332 without any flare is 1.94 inches as shown in FIG. 2.

Figure 10:
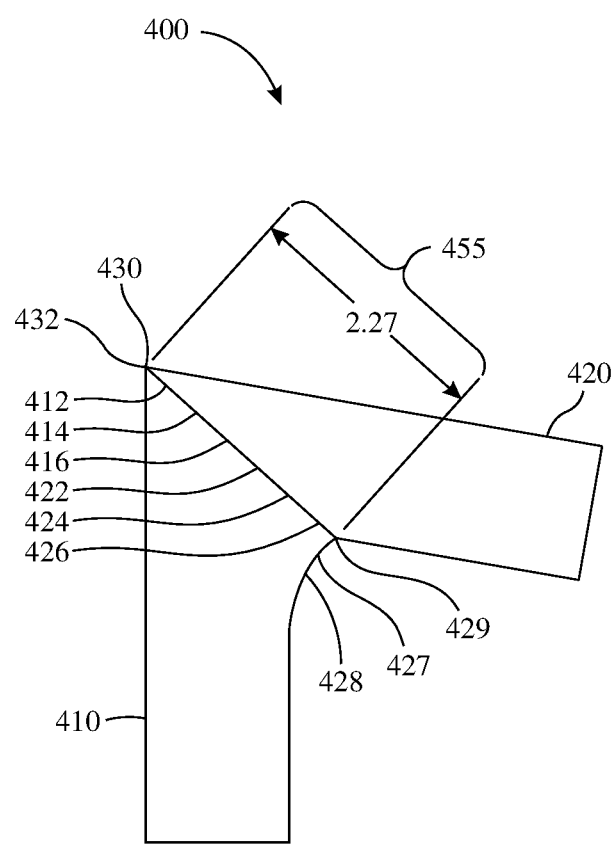
FIG. 10 is a top schematic view of a third embodiment of a handle bar assembly.

Referring to FIG. 10, a handle bar assembly is provided, of which a third embodiment is generally indicated at 400 wherein a remaining pipe has a flared open end at a junction. Handle bar assembly 400 is shown broadly including a first pipe 410, a second pipe 420, and a joint 430. First pipe 410 includes a first open end 412, a first angled cut 414, and a first periphery 416. First periphery 416 may be circular, elliptical, polygonal, or any other shape suitable for the intended purpose and understood by one of ordinary skill in the art. First angled cut 414 may be formed to define first open end 412 of first pipe 410 by cutting, turning, milling, drilling, grinding, sawing, and burning by laser, oxy-fuel burning, and plasma.

Second pipe 420 includes a second open end 422, a second angled cut 424, and a second periphery 426. Second periphery 426 may be circular, elliptical, polygonal, or any other shape suitable for the intended purpose and understood by one of ordinary skill in the art. First periphery 416 and second periphery 426 may be coplanar. Second angled cut 424 may be formed to define second open end 422 of second pipe 420 by cutting, turning, milling, drilling, grinding, sawing, and burning by laser, oxy-fuel burning, and plasma.

Joint 430 may be formed at an interface 432. A cross-section of joint 430 includes a length and width. The length of the cross-section of joint 430 may be approximately 2.27 inches as shown in FIG. 10.

First open end 412 is flared 427 and may have a local thinning in a portion that is flared 427. First open end 412 may be flared prior to joining first pipe 410 to second pipe 420. The local thinning in the portion that is flared 427 increases the periphery of first open end 412 to form a flared periphery. First pipe 410 may be joined to second pipe 420 by welding, soldering, riveting, adhesive bonding, or any other method of joining and assembling.

The flared periphery also increases a pivot radius 428 of the joined first pipe 410 and second pipe 420 as compared to a pivot radius if first open end 412 were not flared. The flared periphery may also lie in a plane. Thus, internal pipe arc 455 of FIG. 10 is greater than internal pipe arc 155 of FIG. 2.

An interior portion of interface 432 may define a pivot surface 429, such that pivot surface 429 is spaced from an exterior portion of interface 432 by a greater distance than if first open end 412 and second open end 422 are free of being flared. For example, the distance between pivot surface 429 and the exterior portion of interface 432 is 2.27 inches as shown in FIG. 10 (similar to the length of the cross-section of joint 430), while the distance between pivot surface 429 and the exterior portion of interface 432 without any flare is 1.94 inches as shown in FIG. 2. Thus, handle bar assembly 400 wherein at least one of the pipes 410, 420 has a flared end at the junction, can accommodate (or pass) a coupling of a wire harness assembly, thereby allowing threading of the wire harness assembly without requiring disassembling the coupling.

Figure 11:
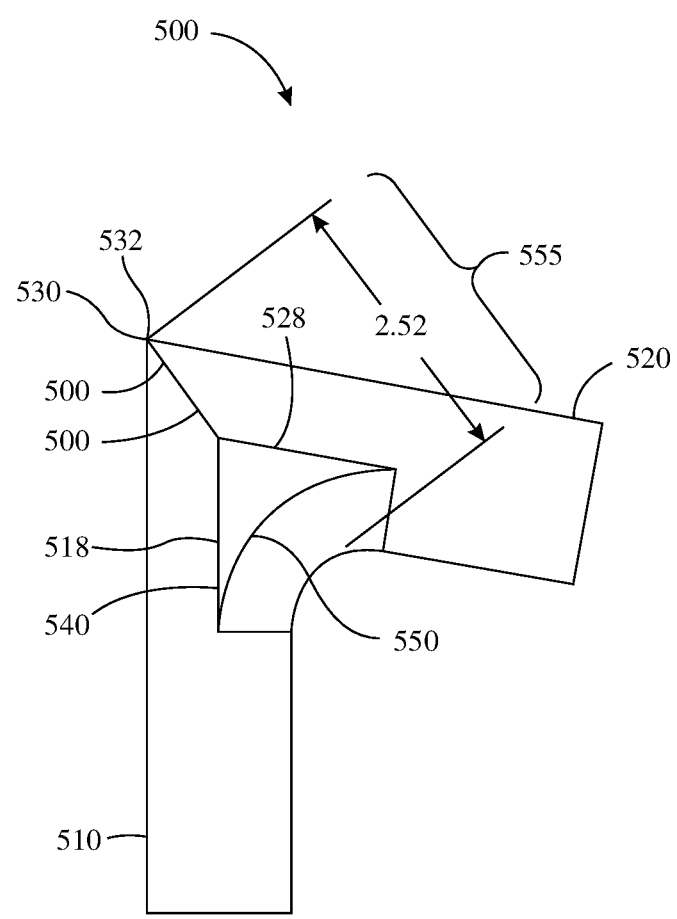
FIG. 11 is a top schematic view of a fourth embodiment of a handle bar assembly.

Referring to FIG. 11, a handle bar assembly is provided, of which a fourth embodiment is generally indicated at 500. Handle bar assembly 500 is shown broadly including a first pipe 510, a second pipe, 520, a joint 530, and an insert 550. First pipe 510 includes a first open end 512, a first angled cut 514, and a first periphery 516. First periphery 516 may be circular, elliptical, polygonal, or any other shape suitable for the intended purpose and understood by one of ordinary skill in the art. First angled cut 514 may be formed to define first open end 512 of first pipe 510 by cutting, turning, milling, drilling, grinding, sawing, and burning by laser, oxy-fuel burning, and plasma.

Second pipe 520 includes a second open end 522, a second angled cut 524, and a second periphery 526. Second periphery 526 may be circular, elliptical, polygonal, or any other shape suitable for the intended purpose and understood by one of ordinary skill in the art. First periphery 516 and second periphery 526 may be coplanar. Second angled cut 524 may be formed to define second open end 522 of second pipe 520 by cutting, turning, milling, drilling, grinding, sawing, and burning by laser, oxy-fuel burning, and plasma.

Joint 530 may be formed at an interface 532. A cross-section of joint 530 includes a length and width. The length of the cross-section of joint 530 may be approximately 2.52 inches as shown in FIG. 11. Thus, internal pipe arc 555 of FIG. 11 is greater than internal pipe arc 155 of FIG. 2.

At least one of first open end 512 and second open end 522 includes a notch 518, 528 configured to form a gap 540 between first pipe 510 and second pipe 520. Insert 550 is affixed to at least one of first pipe 510 and second pipe 520, insert 550 at least partly occluding gap 540. Insert 550 may be disposed within first pipe 510 and second pipe 520. Alternatively, insert 550 may be affixed to an external surface of at least one of first pipe 510 and second pipe 520. By providing gap 540 and insert 550, the length is increased such that the coupling of the wire harness assembly can pass across the corner between first pipe 510 and second pipe 520.

Figure 12:
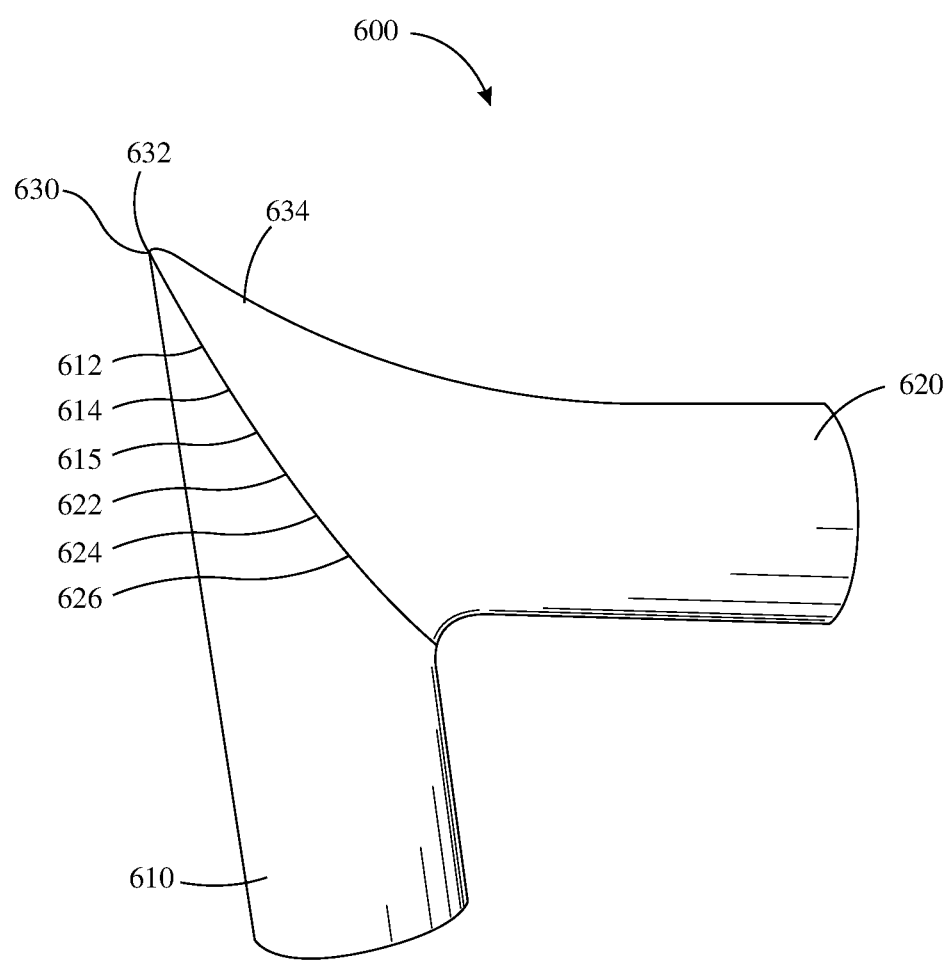
FIG. 12 is a perspective view of a fifth embodiment of a handle bar assembly.

Referring to FIG. 12, a handle bar assembly is provided, of which a fifth embodiment is generally indicated at 600. Handle bar assembly 600 is shown broadly including a first pipe 610, a second pipe 620, and a joint 630. First pipe 610 may include a first open end 612, a first angled cut 614, and a first periphery 616. First periphery 616 may be circular, elliptical, polygonal, or any other shape suitable for the intended purpose and understood by one of ordinary skill in the art. First angled cut 614 may be formed to define first open end 612 of first pipe 610 by cutting, turning, milling, drilling, grinding, sawing, and burning by laser, oxy-fuel burning, and plasma.

Second pipe 620 includes a second open end 622, a second angled cut 624, and a second periphery 626. Second periphery 626 may be circular, elliptical, polygonal, or any other shape suitable for the intended purpose and understood by one of ordinary skill in the art. First periphery 616 and second periphery 626 may be coplanar. Second angled cut 624 may be formed to define second open end 622 of second pipe 620 by cutting, turning, milling, drilling, grinding, sawing, and burning by laser, oxy-fuel burning, and plasma.

Joint 630 may be formed at an interface 632. Second open end 622 may be flared 634 and have a local thinning in a portion that is flared 634. Second open end 622 may be flared 634 prior to joining first pipe 610 to second pipe 620. The local thinning in the portion that is flared 634 may increase the periphery of second open end 622 to form a flared periphery. First pipe 610 may be joined to second pipe 620 by welding, soldering, riveting, adhesive bonding, or any other method of joining and assembling.

The invention has been described in detail with particular reference to a present preferred embodiment, but it will be understood that variations and modifications can be effected within the spirit and scope of the invention. The presently disclosed embodiments are therefore considered in all respects to the illustrative and not restrictive. The scope of the invention is indicated by the appended claims, and all changes that come within the meaning and range of equivalents thereof are intended to be embraced therein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

What is claimed is:

1. A motorcycle metal handle bar assembly for receiving a length of an internally routed wire harness assembly, the motorcycle metal handle bar assembly comprising:
   (a) a first metal pipe having a first open end defined by a first angled cut, wherein the first open end defines a first periphery;
   (b) a second metal pipe having a second open end defined by a second angled cut, wherein the second open end defines a second periphery; and
   (c) a fixed joint at an interface of the first open end and the second open end, the first metal pipe being fixedly joined with the second metal pipe at the fixed joint and wherein at least one of the first open end and the second open end is flared.

2. The motorcycle metal handle bar assembly of claim 1, wherein a portion of the interface defines a pivot surface.

3. The motorcycle metal handle bar assembly of claim 1, wherein both the first open end and the second open end are flared.

4. The motorcycle metal handle bar assembly of claim 1, wherein the flared one of the first open end and the second open end has a local thinning in a portion that is flared.

5. The motorcycle metal handle bar assembly of claim 1, wherein the first periphery and the second periphery are coplanar.

6. The motorcycle metal handle bar assembly of claim 1, wherein at least one of the first periphery and the second periphery is an adjusted periphery, wherein the adjusted periphery exhibits a cross-sectional dimension that is greater than a cross-sectional dimension in an unadjusted portion of the at least one of the first periphery and the second periphery.

7. The motorcycle metal handle bar assembly of claim 1, further comprising the internally routed wire harness assembly passing from the first pipe through the first open end to the second pipe through the second open end.

8. The motorcycle metal handle bar assembly of claim 1, further comprising the first periphery being one of circular, elliptical and polygonal.

9. The motorcycle metal handle bar assembly of claim 1, further comprising the second periphery being one of circular, elliptical and polygonal.

10. The motorcycle metal handle bar assembly of claim 1, further comprising a portion of the first periphery and the second periphery being coplanar.

11. The motorcycle metal handle bar assembly of claim 1, further comprising the flared one of the first open end and the second open end defining a pivot radius.

12. The motorcycle metal handle bar assembly of claim 1, further comprising both the first open end and the second open end are flared.

13. The motorcycle metal handle bar assembly of claim 1, further comprising a flare at both the first open end and the second open end and a local thinning in a portion of the flare in both the first open end and the second open end.

\* \* \* \* \*